(12) United States Patent
Saito et al.

(10) Patent No.: US 8,806,978 B2
(45) Date of Patent: Aug. 19, 2014

(54) ACCELERATOR DEVICE

(75) Inventors: Takehiro Saito, Anjo (JP); Masahiro Makino, Kariya (JP); Hiroshi Saji, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/611,286

(22) Filed: Sep. 12, 2012

(65) Prior Publication Data

US 2013/0074643 A1     Mar. 28, 2013

(30) Foreign Application Priority Data

Sep. 26, 2011  (JP) ................. 2011-209130
Nov. 30, 2011  (JP) ................. 2011-261746

(51) Int. Cl.
*G05G 1/30*     (2008.04)

(52) U.S. Cl.
USPC ......................................................... 74/513

(58) Field of Classification Search
USPC .......................................... 74/512, 513, 560
See application file for complete search history.

(56) References Cited

U.S. PATENT DOCUMENTS

| 4,958,607 | A | * | 9/1990 | Lundberg ........................ 123/399 |
| 5,133,321 | A | * | 7/1992 | Hering et al. .................. 123/399 |
| 6,263,859 | B1 | * | 7/2001 | Kalsi ............................. 123/399 |
| 2003/0066375 | A1 | | 4/2003 | Menzies |
| 2007/0137395 | A1 | | 6/2007 | Ypma |
| 2010/0206122 | A1 | | 8/2010 | Seiltz |

FOREIGN PATENT DOCUMENTS

| JP | 2000-326754 | 11/2000 |
| JP | 2010-158992 | 7/2010 |

OTHER PUBLICATIONS

Office Action (3 pgs.) dated Aug. 15, 2013 issued in corresponding Japanese Application No. 2011-261746 with an at least partial English-language translation thereof (4 pgs.).

* cited by examiner

*Primary Examiner* — Vicky Johnson
(74) *Attorney, Agent, or Firm* — Nixon & Vanderhye P.C.

(57) ABSTRACT

An accelerator device includes: an accommodation part; a rotation shaft having a first end and a second end that are supported by the accommodation part; a pedal part having a first end fixed to the rotation shaft and a second end to be pressed by a driver of a vehicle in an open direction; a return mechanism part biasing the rotation shaft to be rotated in a close direction opposite from the open direction; and a seal member restricting a foreign matter from entering an interior space of the accommodation part.

2 Claims, 15 Drawing Sheets

ACCELERATOR DEVICE

CROSS REFERENCE TO RELATED APPLICATION

This application is based on Japanese Patent Application No. 2011-209130 filed on Sep. 26, 2011 and Japanese Patent Application No. 2011-261746 filed on Nov. 30, 2011 the disclosures of which are incorporated herein by reference in their entirety.

TECHNICAL FIELD

The present disclosure relates to an accelerator device.

BACKGROUND

An accelerator device controls acceleration state of a vehicle according to a stepping amount of a pedal that is connected to a rotation shaft through a pedal arm. A rotation angle of the rotation shaft is detected, and an open degree of a throttle valve which controls the amount of air drawn into an engine of the vehicle is determined based on the rotation angle.

The accelerator device includes a return mechanism part and a hysteresis mechanism part. A driver of the vehicle steps the pedal in an open direction, and the return mechanism part biases the pedal in a dose direction opposite from the open direction. The hysteresis mechanism part makes a force of stepping the pedal larger than a force of canceling the stepping of the pedal. JP-A-2010-158992 describes a manipulated variable input device having two hysteresis mechanism parts which generate different hysteresis characteristics.

A housing of the manipulated variable input device has an opening corresponding to a movable range of the pedal arm. A seal member is arranged in the opening to restrict a foreign matter from entering the manipulated variable input device. The pedal arm is connected to an end of the rotation shaft that protrudes outward from the housing through the opening.

However, when only the other end of the rotation shaft is supported by the housing as cantilever structure, a direction of force applied to the other end of the rotation shaft may be varied between when the pedal is not operated and when the pedal is operated. In this case, the rotation shaft may be deformed, and the rotation shaft cannot have stable rotation.

SUMMARY

It is an object of the present disclosure to provide an accelerator device in which a rotation shaft can be stably rotated.

According to an example of the present disclosure, an accelerator device includes an accommodation part, a rotation shaft, a pedal part, a rotation angle detector, a return mechanism part, and a seal member. The accommodation part is to be attached to a vehicle. The rotation shaft has a first end and a second end that are supported by the accommodation part. The pedal part has a first end fixed to the rotation shaft and a second end to be pressed by a driver of the vehicle in an open direction. The rotation angle detector is accommodated in an interior space of the accommodation part and detects a rotation angle of the rotation shaft with respect to the accommodation part. The return mechanism part is accommodated in the interior space of the accommodation part and biases the rotation shaft to be rotated in a close direction opposite from the open direction. The seal member is arranged in a clearance through which the interior space of the accommodation part communicates with outside of the accommodation part, and restricts a foreign matter from entering the interior space of the accommodation part.

Therefore, the both ends of the rotation shaft are supported by the accommodation part, so the force applied to the rotation shaft from the pedal part can be dispersed to the both ends. Thus, the force applied to the rotation shaft can be balanced. Accordingly, the rotation shaft can be stably rotated, and a foreign matter is restricted from entering the interior space of the accommodation part.

The clearance may be defined between the accommodation part and an outer wall of the rotation shaft.

The accelerator device may further include a hysteresis mechanism part generating a hysteresis characteristics to maintain an accelerator opening corresponding to a rotation angle of the rotation shaft immediately before a rotation force applied to the rotation shaft is increased and to maintain an accelerator opening corresponding to a rotation angle of the rotation shaft immediately before the rotation force applied to the rotation shaft is canceled, and the hysteresis mechanism part may be accommodated in the interior space of the accommodation part.

The accommodation part may have a first support supporting the first end of the rotation shaft and a second support supporting the second end of the rotation shaft, and the pedal part may be fixed to a center of the rotation shaft that is located in an outside space defined between the first support and the second support.

Therefore, a half of the self weight of the pedal part and the rotation moment of the pedal part is equally applied to the first support and the second support.

The first end of the pedal part may be branched into a first part and a second part. The first part may be fixed to the first end of the rotation shaft protruding from the accommodation part, and the second part may be fixed to the second end of the rotation shaft protruding from the accommodation part.

Therefore, a half of the self weight of the pedal part and the rotation moment of the pedal part is equally applied to the first end of the rotation shaft and the second end of the rotation shaft. Moreover, because the accommodation part supports the first end and the second end of the rotation shaft, a force of the accommodation part supporting the rotation shaft is equally applied to the rotation shaft.

DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
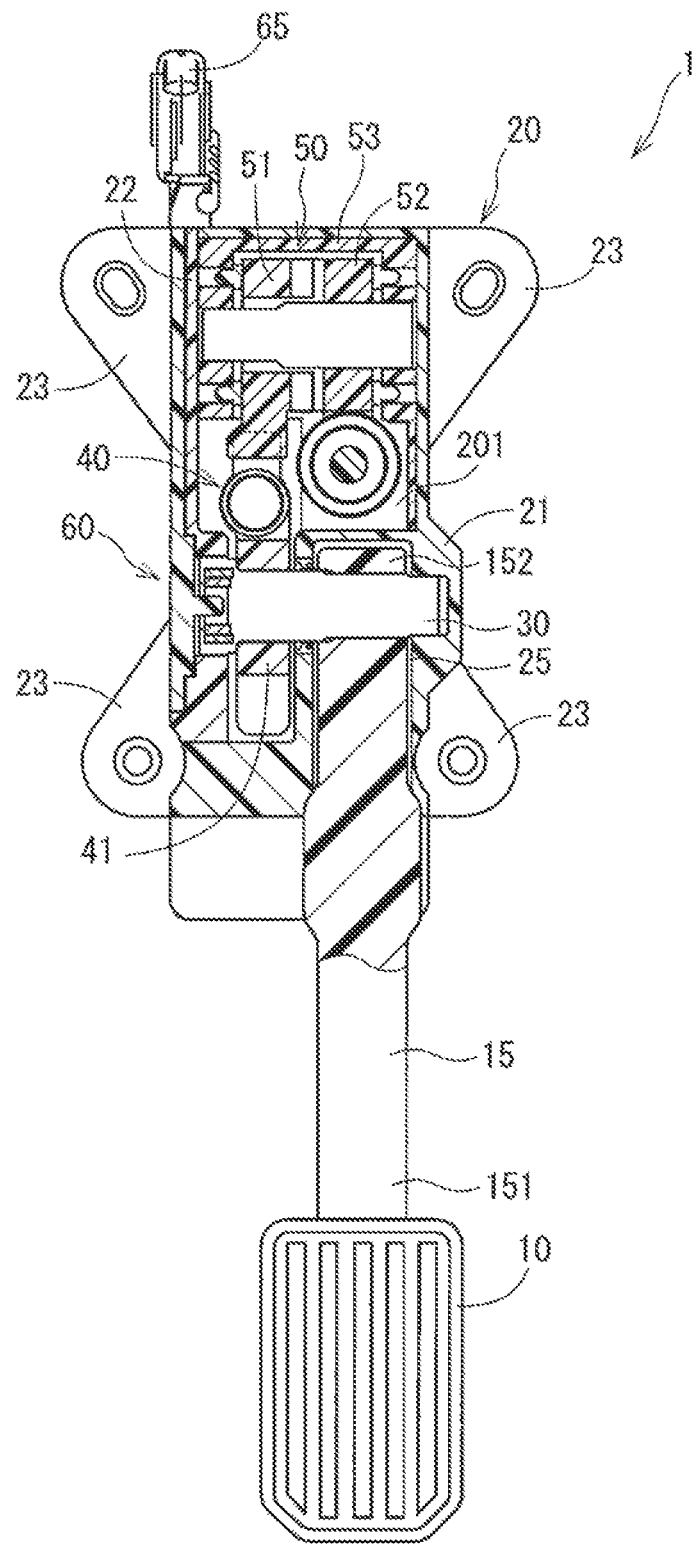
FIG. 1 is a view illustrating an accelerator device according to a first embodiment.

Embodiments of the present invention will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

An accelerator device 1 according to a first embodiment will be described with reference to FIGS. 1-4.

As shown in FIG. 1, the accelerator device 1 is equipped with a pedal 10, a pedal arm 15, an accommodation part 20, a rotation shaft 30, a return mechanism part 40, a hysteresis mechanism part 50, and a rotation angle detector 60.

Figure 3:
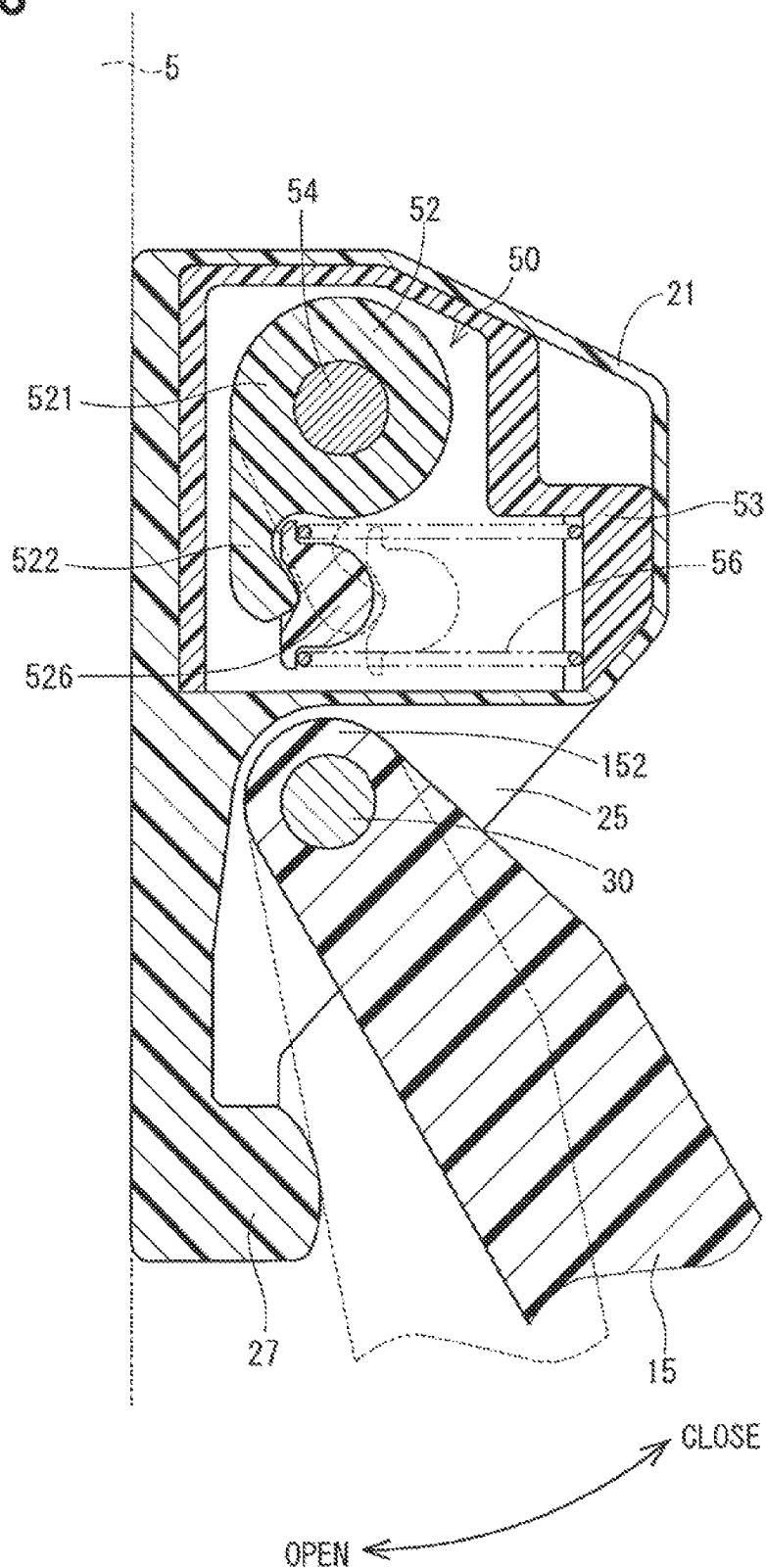
FIG. 3 is a cross-sectional view taken along a line III-III of FIG. 2.

As shown in FIG. 3, when a driver of a vehicle presses the pedal 10, the arm 15 is defined to rotate in an open direction centering at the shaft 30. When the driver releases the pedal 10, the arm 15 is defined to rotate in a close direction opposite from the open direction.

As shown in FIG. 1, the arm 15 has a first end portion 152 and a second end portion 151. The pedal 10 is arranged to the second end portion 151 of the pedal arm 15. The shaft 30 is horizontally inserted in the first end portion 152 of the pedal arm 15. The pedal arm 15 is located to be offset rightward relative to the accelerator device 1. The pedal 10 and the arm 15 may correspond to a pedal part.

Figure 4:
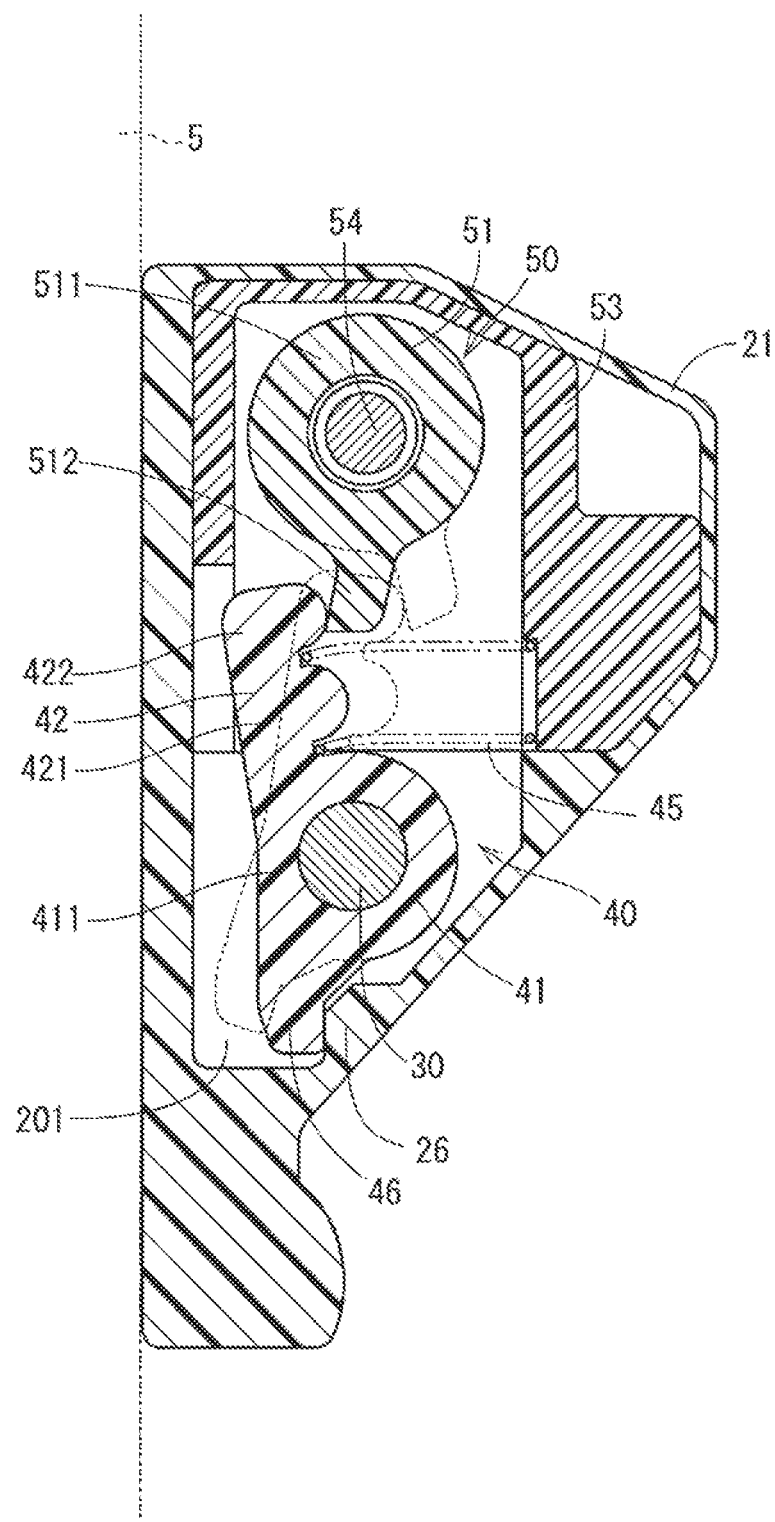
FIG. 4 is a cross-sectional view taken along a line IV-IV of FIG. 2.

The accommodation part 20 is equipped with a housing 21, a covering 22, and a base portion 23. The accommodation part 20 accommodates the return mechanism part 40, the hysteresis mechanism part 50, and the rotation angle detector 60 in an interior space 201 of the housing 21, and is attached to a chassis 5 of the vehicle, as shown in FIGS. 3 and 4.

Figure 2:
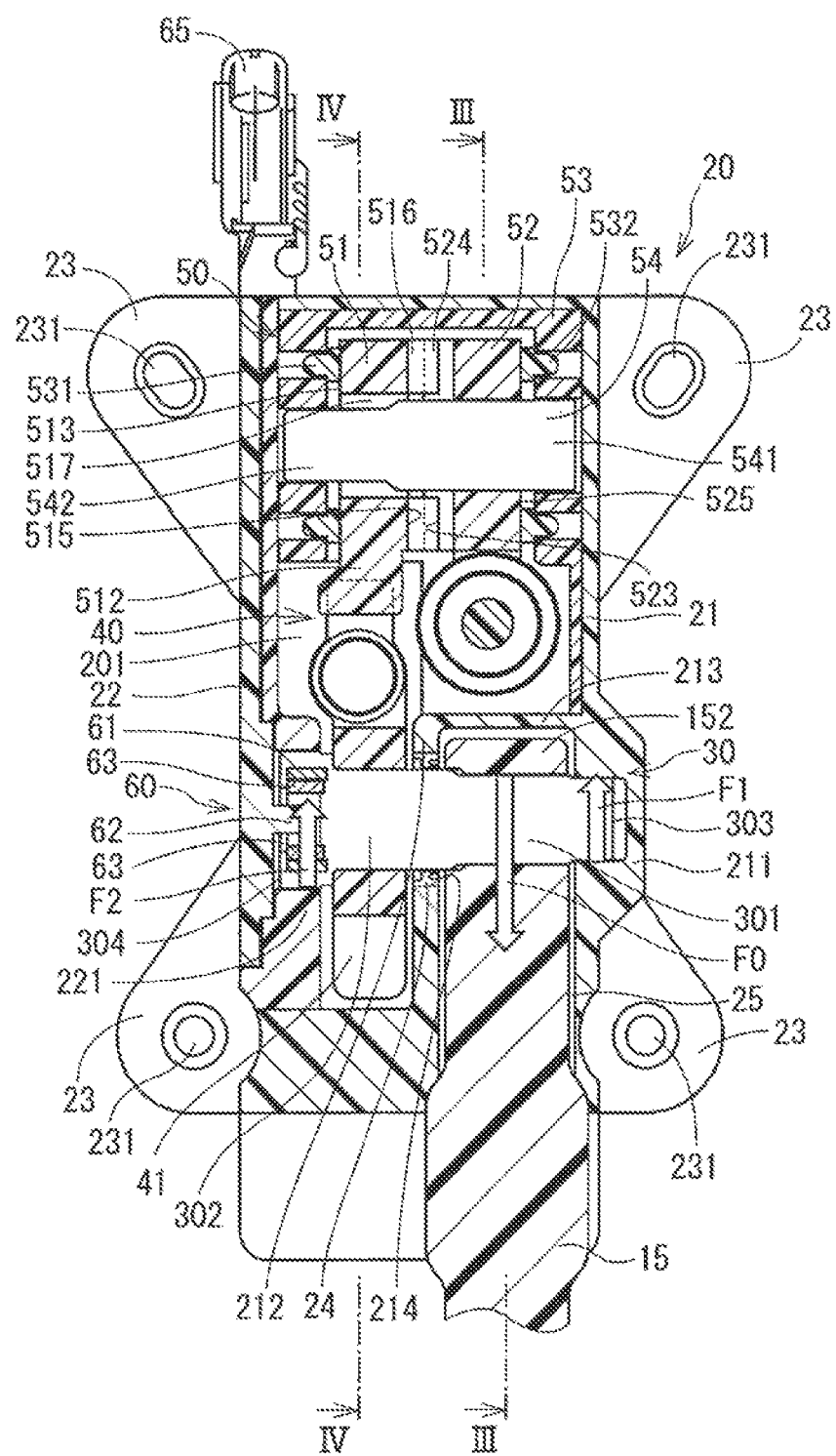
FIG. 2 is a cross-sectional view illustrating an accommodation part of the accelerator device of the first embodiment.

The housing 21 has a box shape and may be made of resin material. The housing 21 has a concave-shaped arm accommodator 25 on the lower-right side in FIG. 1. The first end portion 152 of the pedal arm 15 is accommodated in the arm accommodator 25 of the housing 21 in the state where the first end portion 152 is fixed to the shaft 30. As shown in FIG. 2, the arm accommodator 25 and the interior space 201 are partitioned from each other by a first wall 212 extending in a gravity direction and a second wall 213 extending in a horizontal direction. The first wall 212 has a through hole 214 into which the shaft 30 is inserted. An annular oil seal 24 is arranged between a wall of the through hole 214 and an outer wall of the shaft 30. The oil seal 24 intercepts the arm accommodator 25 from the interior space 201. The through hole 214 may correspond to a clearance.

As shown in FIG. 3, a full-open stopper 27 is disposed at the lower part of the housing 21. When the driver presses the pedal 10, and when the pedal arm 15 contacts the stopper 27, the pedal arm 15 is restricted from moving in the open direction.

The covering 22 has a flat plate shape and may be made of resin material. The housing 21 has an opening on the left side, and the interior space 201 of the housing 21 is sealed by attaching the covering 22 to the opening of the housing 21.

The base portion 23 is defined at four corners of the accommodation part 20, and has a through hole 231. The accommodation part 20 is attached to the chassis 5 using a fastening member such as bolt to the through hole 231.

The rotation shaft 30 is located at the lower section of the accommodation part 20, and extends perpendicular to the pedal arm 15. More specifically, the shaft 30 is arranged to penetrate the through hole 214 of the first wall 212 in the horizontal direction. The rotation shaft 30 has a small diameter part 301 and a large diameter part 302.

The small diameter part 301 has a pillar shape, and is fixed to the first end portion 152 of the pedal arm 15. Thereby, a rotation angle of the pedal arm 15 corresponds to a rotation angle of the rotation shaft 30 with one-to-one relationship. A first end 303 of the small diameter part 301 of the shaft 30 is rotatably supported by a first bearing 211 of the housing 21.

The large diameter part 302 is connected to the small diameter part 301, and has a pillar shape with a diameter larger than that of the small diameter part 301. The larger diameter part 302 is fixed to a return rotor 41 of the return mechanism part 40. Thereby, a rotation angle of the rotation shaft 30 corresponds to a rotation angle of the return rotor 41 with one-to-one relationship.

A second end 304 of the shaft 30 is formed to have a diameter larger than that of the large diameter part 302, and is rotatably supported by a second bearing 221 of the covering 22. The first bearing 211 may correspond to a first support, and the second bearing 221 may correspond to a second support.

As shown in FIG. 4, the return mechanism part 40 is equipped with a return spring 45 in addition to the return rotor 41. Because the return spring 45 generates a biasing force according to the rotation angle of the pedal arm 15, the return mechanism part 40 biases the pedal arm 15 in the close direction.

The return rotor 41 is equipped with a boss part 411, a first arm part 42, and a second arm part 46. In FIG. 4, a continuous line represents the rotation state of the return rotor 41 and a first rotor 51 of the hysteresis mechanism part 50 when the pedal 10 is not pressed. A dashed line of FIG. 4 represents the rotation state of the return rotor 41 and the first rotor 51 when the pedal 10 is pressed.

The boss part 411 has a cylindrical shape, and the large diameter part 302 of the rotation shaft 30 is fixed to the center of the boss part 411 by press-fitting. As shown in FIG. 4, the first arm part 42 is formed on the upper side of the boss part 411 to extend upward from the upper part of the boss part 411. Moreover, the second arm part 46 is formed on the lower side of the boss part 411 to extend downward from the lower part of the boss part 411.

The first arm part 42 has a spring support part 421 and an engagement part 422. The spring support part 421 is located between the engagement part 422 and the boss part 411, and supports a first end of the return spring 45. The engagement part 422 is engaged with an engagement part 512 of the first rotor 51. Thereby, as shown in FIG. 4, when the return rotor 41 rotates clockwise centering at the rotation shaft 30, the first rotor 51 rotates counterclockwise according to the rotation angle of the return rotor 41.

When the return rotor 41 rotates counterclockwise centering at the rotation shaft 30, the second arm part 46 contacts a full-close stopper 26 of the housing 21. That is, the second arm part 46 regulates the rotation of the return rotor 41 in the counterclockwise direction.

A second end of the return spring 45 is supported by an inner wall of a housing 53 of the hysteresis mechanism part 50. The return spring 45 biases the return rotor 41 to be rotated in the counterclockwise direction in FIG. 4. Thereby, when the pedal 10 is pressed, the biasing force of the spring 45 acts on the pedal arm 15 to be rotated in the close direction.

Moreover, when the return rotor 41 rotates in the counterclockwise direction, the second arm part 46 contacts the full-close stopper 26. Thereby, when the pedal 10 is not pressed, the rotation angle of the rotation shaft 30 is maintained in a state where the second arm part 46 contacts the full-close stopper 26.

The hysteresis mechanism part 50 is equipped with the housing 53, a rotation shaft 54, the first rotor 51, a second rotor 52, and a spring 56. The hysteresis mechanism part 50 causes a difference between a force necessary for the driver to press the pedal 10 and a force necessary to release the pedal 10. Thereby, the driver of the vehicle can easily operate the pedal 10.

The housing 53 has a box shape and may be made of resin material. The rotation shaft 54, the first rotor 51, the second rotor 52, and the spring 56 are accommodated in the housing 53. An outer surface of the housing 53 contacts inner surface of the housing 21 and the covering 22.

As shown in FIG. 2, the rotation shaft 54 of the hysteresis mechanism part 50 is formed to extend parallel to the rotation shaft 30. Both ends of the rotation shaft 54 are rotatably supported by the housing 53. The rotation shaft 54 has a large diameter part 541 and a small diameter part 542. The small diameter part 542 is inserted into a through hole 517 of the first rotor 51. The large diameter part 541 is fixed to the second rotor 52 by press-fitting.

As shown in FIG. 4, the first rotor 51 has a boss part 511 in addition to the engagement part 512. The first rotor 51 is arranged on the upper side of the return rotor 41 and the first arm part 42.

The boss part 511 has a cylindrical shape and, as shown in FIG. 2, a left side face 513 of the boss part 511 of the first rotor 51 contacts an annular first friction plate 531 of the housing 53. Moreover, a right side face 515 of the boss part 511 of the first rotor 51 has plural helical gear teeth 516 in a rotation direction. The gear teeth 516 of the first rotor 51 have inclined surface to be contact with inclined surface of plural helical gear teeth 524 of the second rotor 52.

The engagement part 512 is formed to extend downward from the lower part of the boss part 511, as shown in FIG. 4. The engagement part 512 of the first rotor 51 is engaged with the engagement part 422 of the return rotor 41, thereby the rotation angle of the return rotor 41 and the rotation angle of the first rotor 51 correspond with each other with one-to-one relationship. For example, when the return rotor 41 has a predetermined angle rotation in the clockwise direction centering at the rotation shaft 30, the first rotor 51 has the predetermined angle direction in the counterclockwise direction.

The second rotor 52 is located on tree right side of the first rotor 51, and has a boss part 521 and a first arm part 522, as shown in FIG. 3.

The boss part 521 has a cylindrical shape, and a left side face 523 of the boss part 521 has the plural helical gear teeth 524 in a rotation direction. The gear teeth 524 have the inclined surface, and is engaged with the gear teeth 516 of the first rotor 51 through the inclined surface. Moreover, a right side face 525 of the boss part 521 contacts with an annular second friction plate 532 of the housing 53.

The first arm part 522 is formed to extend downward from the lower part of the boss part 521. The first arm part 522 contacts a pan-shaped spring support part 526 of the hysteresis mechanism part 50, as shown in FIG. 3. A first end of the spring 56 is supported with the spring support part 526.

A second end of the spring 56 opposite from the first end is supported with the inner wall of the housing 53. The spring 56 biases the second rotor 52 to be rotated in the clockwise direction in FIG. 3.

As shown in FIG. 2, the rotation angle detector 60 has a rotor 61 and a projection part 62. The rotor 61 is fixed to inside of the second end 304 of the rotation shaft 30. The projection part 62 is projected into the rotor 61. A Hall IC (not shown) is arranged at each diagonal corner of the projection part 62 (total number of the Hall ICs is two). The rotation angle detector 60 detects the rotation angle of the rotor 61 using the two Hall ICs.

Specifically, when the driver presses the pedal 10 and when the pedal arm 15 rotates centering at the rotation shaft 30, the rotation shaft 30 and the rotor 61 fixed to the rotation shaft 30 rotate by the same rotation angle as the pedal 10. At this time, a magnet 63 arranged on the inner wall of the rotor 61 is also rotated by the same rotation angle. Thereby, the magnetic field around the projection part 62 is varied. The Hall IC of the rotation angle detector 60 converts the variation in the magnetic field into an electrical signal. The electrical signal is transmitted to an electronic control unit (ECU) of the vehicle via a terminal 65. Thereby, the ECU detects the rotation position of the pedal 10.

Figure 5A:
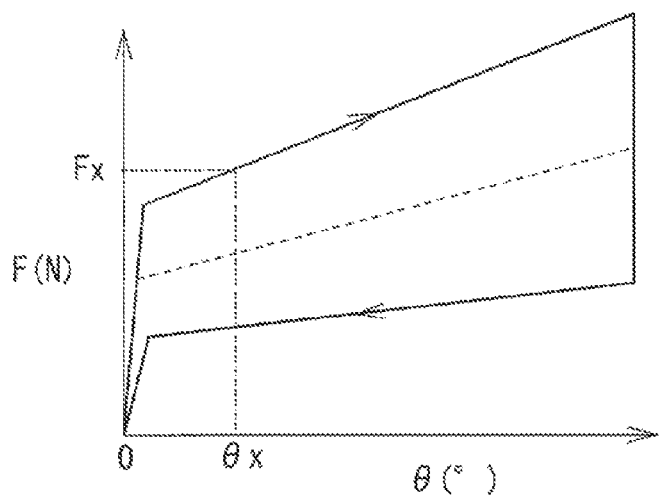
FIG. 5A is a graph illustrating a relationship between a rotation angle of a pedal arm of the accelerator device and a first load necessary for a hysteresis mechanism part of the accelerator device to maintain the rotation angle.

Operation of the accelerator device 1 will be described with reference to FIGS. 5A, 5B and 5C. FIG. 5A is a graph illustrating a relationship between a rotation angle θ of the pedal arm 1 and a first load F necessary for the hysteresis mechanism part 50 to maintain the rotation angle θ. The first load F represents a force applied by the driver to maintain the rotation angle θ of the pedal arm 15.

Figure 5B:
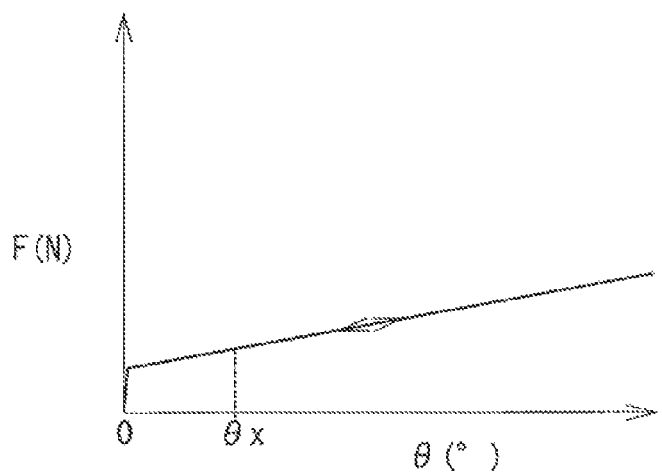
FIG. 5B is a graph illustrating a relationship between a rotation angle of the pedal arm of the accelerator device and a second load necessary for a return mechanism part of the accelerator device to maintain the rotation angle.

FIG. 5B is a graph illustrating a relationship between a rotation angle θ of the pedal arm 15 and a second load F necessary for the return mechanism part 40 to maintain the rotation angle θ. Moreover, FIG. 5C is a graph illustrating a relationship between a rotation angle θ of the pedal arm 15 and the sum of the first load F of FIG. 5A and the second load F of FIG. 5B.

When the driver does not press the pedal 10, the pedal 10 is located at a predetermined position. At this time, the full-close stopper 26 restricts the pedal arm 15 from rotating, because the second arm part 46 of the return mechanism part 40 contacts the full-close stopper 26. The pedal arm 15 located at the predetermined position is defined to have a rotation angle of zero (θ=0°), and the predetermined position corresponds to an origin point of FIGS. 5A, 5B and 5C.

When the driver presses the pedal 10, the rotation angle θ of the pedal arm 15 becomes large, that is, the value in the horizontal axis of FIG. 5A becomes large. At this time, the hysteresis mechanism part 50 requires a load Fx, as shown in FIG. 5A. The load Fx is calculated by adding a frictional force between the first friction plate 531 and the left side face 513 of the first rotor 51 and a frictional force between the second friction plate 532 and the right side face 525 of the second rotor 52 to a load computed using a spring constant of the spring 56 and an angle of the biasing force generated by the spring 56 corresponding to a rotation angle θx of the pedal arm 15.

In the hysteresis mechanism part 50, the gear teeth 516 of the first rotor 51 and the gear teeth 524 of the second rotor 52 mesh with each other by contacting through the inclined surfaces. When the driver presses the pedal 10, the first rotor 51 and the second rotor 52 rotate in the state where the inclined surfaces contact with each other. Therefore, an interval between the first rotor 51 and the second rotor 52 becomes large, and the frictional force between the first friction plate 531 and the left side face 513 of the first rotor 51 and the frictional force between the second friction plate 532 and the right side face 525 of the second rotor 52 increase. Thus, in the hysteresis mechanism part 50, when the pedal 10 is pressed, the load Fx is generated which is larger than the biasing force of the single spring 56, as shown in FIG. 5A. In contrast, in the return mechanism part 40, the biasing force is generated which corresponds to the rotation angle θx of the pedal arm 15, as shown in FIG. 5B.

When the driver releases the pedal 10, the rotation angle θ of the pedal arm 15 becomes small. At this time, as shown in FIG. 5A, when the rotation angle θ of the pedal arm 15 becomes small, in the hysteresis mechanism part 50, the load F required for maintaining the rotation angle θx of the pedal arm 15 becomes small, compared with a case where the rotation angle of the pedal arm 15 becomes large, because a restoring force of the spring 56 is relatively weakened due to the frictional force between the first friction plate 531 and the left side face 513 of the first rotor 51 and the frictional force between the second friction plate 532 and the right side face 525 of the second rotor 52. In contrast, in the return mechanism part 40, the biasing force is generated which corresponds to the rotation angle θx of the pedal arm 15, as shown in FIG. 5B.

Figure 5C:
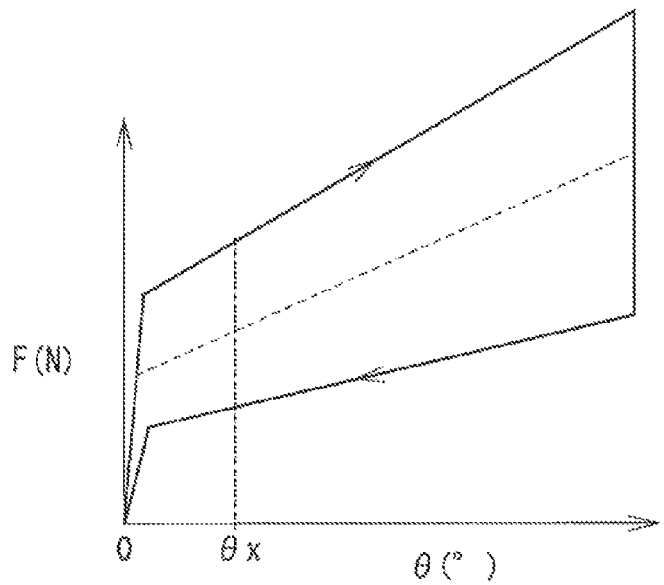
FIG. 5C is a graph illustrating a relationship between a rotation angle of the pedal arm and a sum of the first load and the second load.

FIG. 5C is a graph illustrating a relationship between the rotation angle θ of the pedal arm 15 and the total load F of the hysteresis mechanism part 50 and the return mechanism part 40. When the rotation angle θ of the pedal arm 15 is increased by pressing the pedal 10 by the driver, the load F for maintaining the rotation angle θx of the pedal arm 15 is increased according to the value of the rotation angle θx. Moreover, when the driver releases the pedal 10, the load F for maintaining the rotation angle θx of the pedal arm 15 is similarly needed according to the value of the rotation angle θx.

However, the load F needed to maintain the rotation angle θx is different between the case where the rotation angle θx of the pedal arm 15 is increased and the case where the rotation angle θx of the pedal arm 15 is decreased, even if the rotation angle θx of the pedal arm 15 is the same value. That is, the load F needed to maintain the rotation angle θ is small in the case where the rotation angle θ of the pedal arm 15 is decreased, compared with the case where the rotation angle θ of the pedal arm 15 is increased.

Because the rotation angle θ of the pedal arm 15 does not become large rapidly when the driver presses the pedal 10, the vehicle is restricted from accelerating rapidly. Moreover, because the rotation angle θ of the pedal arm 15 does not become small rapidly when the driver releases the pedal 10, the vehicle is restricted from slowing down rapidly.

According to the first embodiment, the first end 303 and the second end 304 of the rotation shaft 30 are supported by the first bearing 211 and the second bearing 221, respectively. As shown in FIG. 2, a downward force F0 acts on the small diameter part 301 of the rotation shaft 30 that supports the pedal arm 15. On the other hand, the first bearing 211 and the second bearing 221 are contact with the first end 303 and the second end 304 of the rotation shaft 30, respectively, thereby rotatably supporting the rotation shaft 30. At this time, upward forces F1 and F2 corresponding to the downward force F0 act on the rotation shaft 30 at the first bearing 211 and the second bearing 221, respectively.

That is, while the downward force F0 acts to the small diameter part 301 of the rotation shaft 30, the upward forces F1 and F2 act to the first end 303 of the small diameter part 301 and the second end 304 of the large diameter part 302, respectively. Thereby, the forces F1, F2 act in the same direction to the both ends 303, 304 of the rotation shaft 30, therefore the rotation of the rotation shaft 30 is stabilized, compared with a comparison example where a rotation shaft is supported by only one end (cantilever structure).

Therefore, when the driver presses the pedal 10 and when the pressing force acts on the rotation shaft 30, the rotation shaft 30 does not deform. That is, a foreign matter is restricted from entering the interior space 201 of the accelerator device 1 by intercepting the interior space 201 from the arm accommodator 25, and the rotation shaft 30 can be stably rotated.

According to the first embodiment, the first end 303 and the second end 304, which are located to oppose with each other through the small diameter part 301, are respectively supported by the first bearing 211 and the second bearing 221. Thereby, in the both cases where the pedal 10 is not pressed and is located at the full-close position and the case where the pedal 10 is operated, as shown in FIG. 2, the lower faces of the first end 303 and the second end 304 in the gravity direction respectively move slidingly with the inner surfaces of the first bearing 211 and the second bearing 221.

Therefore, the direction of the force acting on the rotation shaft 30 when the pedal 10 is not pressed and located at the full-close position, and the direction of the force acting on the rotation shaft 30 when the pedal 10 is operated are made the same, thus the rotation shaft 30 can be stably rotated, compared with the comparison example.

In the comparison example, the rotation shaft is cantilevered, that is, only the second end of the rotation shaft is supported while the first end of the rotation shaft is not supported. For this reason, a surface of the second end of the rotation shaft sliding with the accommodation part when the pedal is not pressed is different from a surface of the second end of the rotation shaft sliding with the accommodation part when the accelerator is operated. Specifically, when the pedal is operated, a downward force applies to the first end of the rotation shaft, and the second end of the rotation shaft moves upward in the gravity direction. Therefore, the upper face of the second end in the gravity direction slides with the accommodation part when the pedal is operated, while the lower face of the second end in the gravity direction slides with the accommodation part when the pedal is not pressed.

According to the first embodiment, the oil seal 24 prevents a foreign matter from entering the interior space 201 from outside of the housing 21. Thus, the foreign matter is restricted from entering into the return mechanism part 40, the hysteresis mechanism part 50, and the rotation angle detector 60 which are accommodated in the housing 21. Therefore, the accelerator device 1 can operate stably.

Second Embodiment

An accelerator device 2 according to a second embodiment will be described with reference to FIGS. 6-8. The number and the position of the hysteresis mechanism parts of the second embodiment are different from those of the first embodiment. The same reference codes are provided to approximately the same components as the first embodiment, and the explanation is omitted.

Figure 6:
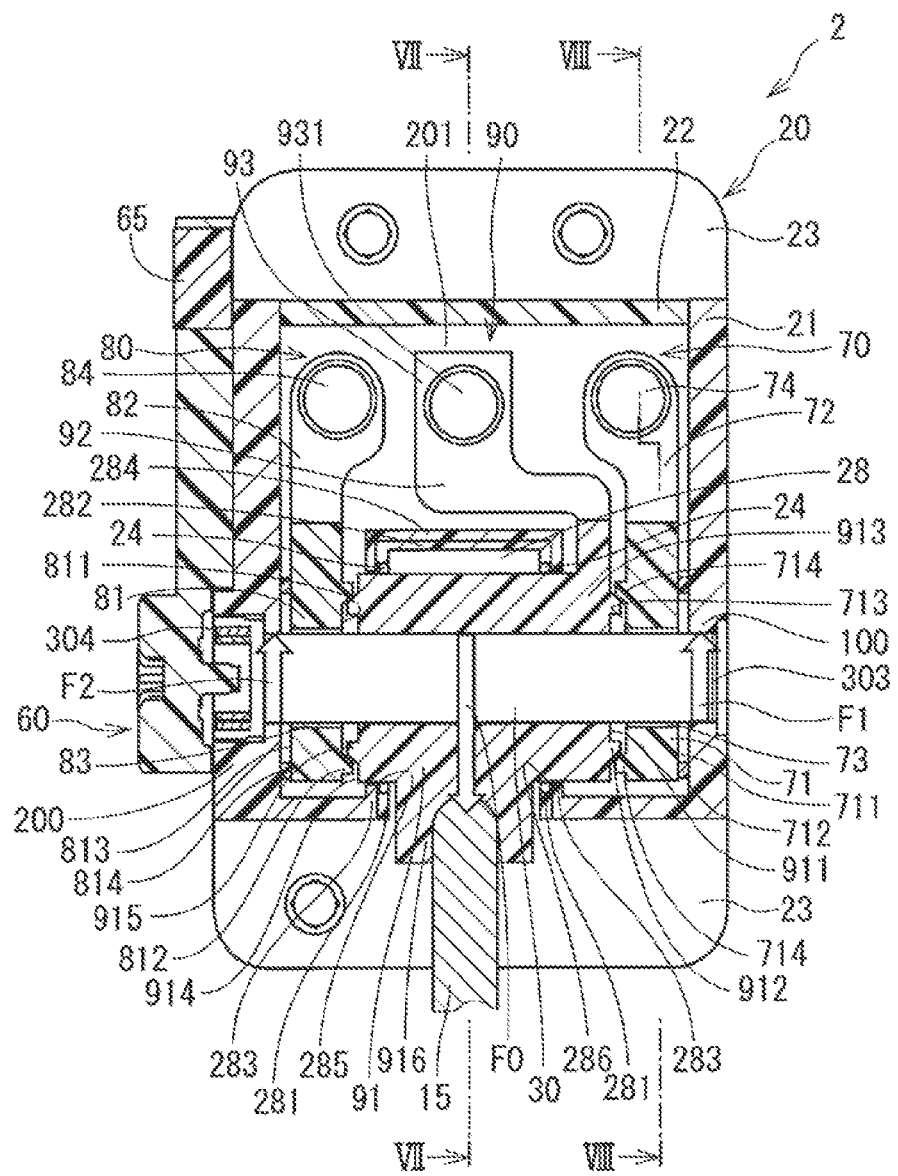
FIG. 6 is a cross-sectional view illustrating an accelerator device according to a second embodiment.

As shown in FIG. 6, the accelerator device 2 is equipped with the accommodation part 20, a return mechanism part 90, a first hysteresis mechanism part 70, a second hysteresis mechanism part 80, and the rotation angle detector 60. The return mechanism part 90 is located at the center of the accommodation part 20. The first hysteresis mechanism part 70 is located on the right side of the return mechanism part 90. The second hysteresis mechanism part 80 is located on the left side of the return mechanism part 90. The rotation angle of the shaft 30 is detected by the rotation angle detector 60, and the shaft 30 extends in the horizontal direction at the lower section of the accommodation part 20. The rotation shaft 30 penetrates a rotor 81 of the second hysteresis mechanism part 80, the return rotor 91, and a rotor 71 of the first hysteresis mechanism part 70, in this order from the side of the detector 60. The pedal arm 15 is fixed to a connector 916 defined at the center of the return rotor 91. The return rotor 91 may correspond to a rotation shaft.

Figure 7:
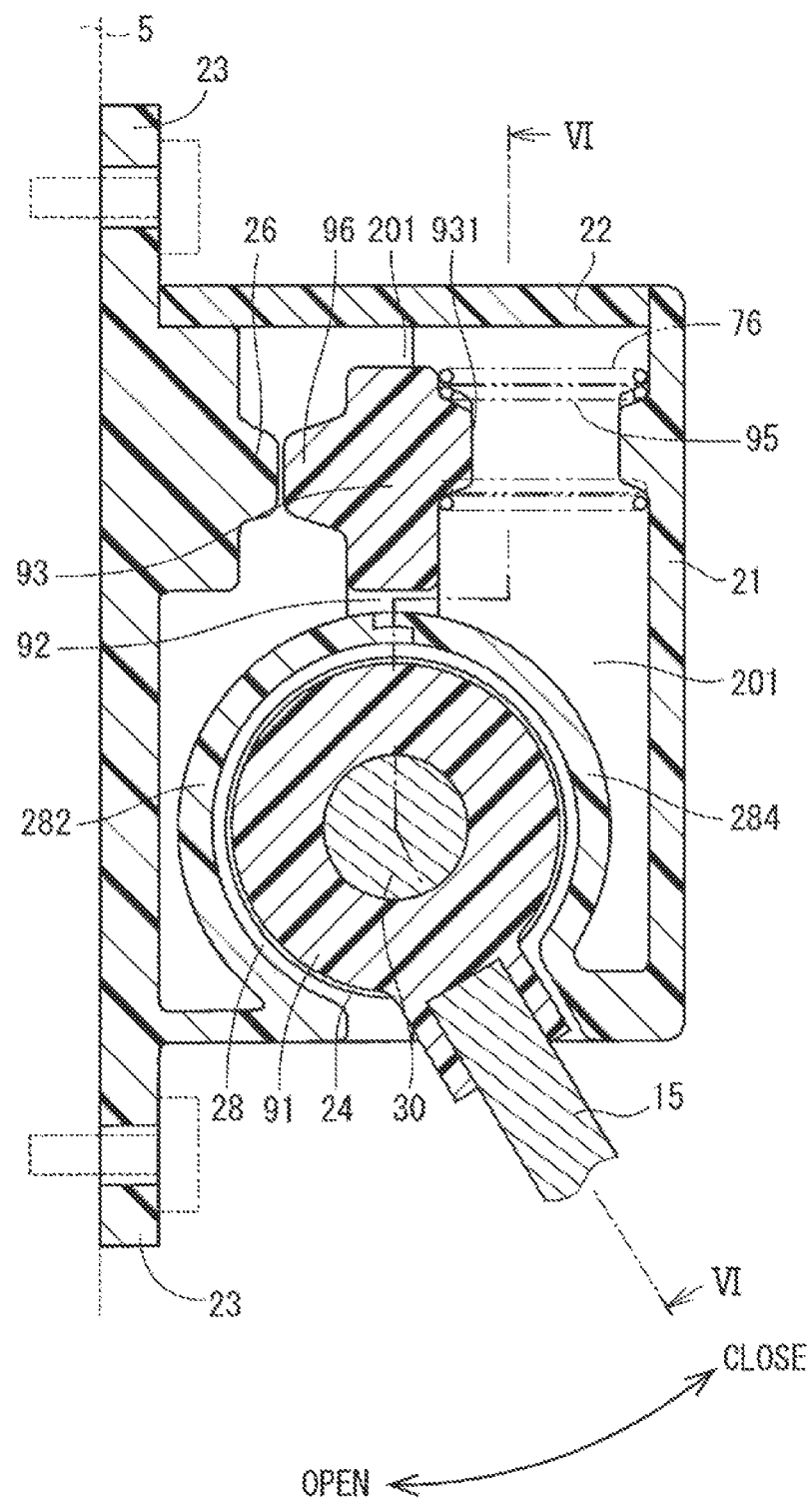
FIG. 7 is a cross-sectional view taken along a line VII-VII of FIG. 6.

As shown in FIG. 7, the accommodation part 20 is equipped with the housing 21, the covering 22, and the base portion 23. The base portion 23 of the accommodation part 20 is attached to the chassis 5 of the vehicle. The base portion 23 has a full-close stopper 26 projected away from the chassis 5, a semi-circle shape first separation wall 281 and a semi-cylinder shape second separation wall 282. The housing 21 opposing to the chassis 5 through the base portion 23 has a semi-circle shape third separation wall 283 and a semi-cylinder shape fourth separation wall 284.

An interior space 201 of the accelerator device 2 is a tightly-closed space defined by the covering 22, the housing 21, and the base portion 23, and the covering 22 is mounted to the upper side of the accelerator device 2. The separation walls 281, 282, 283, 284 define a rotor accommodator 28 accommodating the return rotor 91. The rotor accommodator 28 has a cylindrical shape with a center axis extending in the horizontal direction.

The first separation wall 281 has a through hole 285, and the third separation wall 283 has a through hole 286. The return rotor 91 is inserted into the through holes 285, 286. An annular oil seal 24 is arranged between the through hole 285 and an outer wall of the return rotor 91, and between the through hole 286 and an outer wall of the return rotor 91. The oil seal 24 intercepts the interior space 201 from the rotor accommodator 28. The base portion 23 and the housing 41 have a first bearing 100 and a second bearing 200 respectively rotatably supporting the first end 303 and the second end 304 of the rotation shaft 30. The first bearing 100 may correspond to a first support, and the second bearing 200 may correspond to a second support.

The rotation shaft 30 is fixed to the center of the return rotor 91, for example, by press-fitting. Because the pedal arm 15 is fixed to the connector 916 of the return rotor 91, a rotation angle of the pedal arm 15 corresponds to a rotation angle of the return rotor 91 with one-to-one relationship.

A right side face 911 of the return rotor 91 has first helical gear teeth 912. The gear teeth 912 of the return rotor 91 have inclined surface to be contact with inclined surface of helical gear teeth 714 of the rotor 71 of the first hysteresis mechanism part 70. An arm part 92 of the return mechanism part 90 is connected to a right end portion 913 of the return rotor 91. A left side face 914 of the return rotor 91 has second helical gear teeth 915. The gear teeth 915 of the return rotor 91 have inclined surface to be contact with inclined surface of helical gear teeth 812 of the rotor 81 of the second hysteresis mechanism part 80.

As shown in FIG. 7 the return mechanism part 90 is equipped with a return spring 95 in addition to the arm part 92. The arm part 92 extends, as shown in FIG. 6, upward from the right end portion 913, and extends parallel with the return rotor 91 on the upper side, then further extends upward on the upper side of the return rotor 91. An upper end portion 93 of the arm part 92 has a spring support part 931. A first end of the spring 95 is supported by the spring support part 931. A second end of the spring 95 is, as shown in FIG. 7, supported by the inner wall of the housing 21. The spring 95 biases the return rotor 91 to rotate counterclockwise in FIG. 7. The upper end portion 93 has a regulator 96 on the side opposite from the spring support part 931. When the pedal 10 is not pressed, the regulator 96 contacts the full-close stopper 26 of the base portion 23. Thereby, the return rotor 91 is regulated from rotating in the counterclockwise direction.

Figure 8:
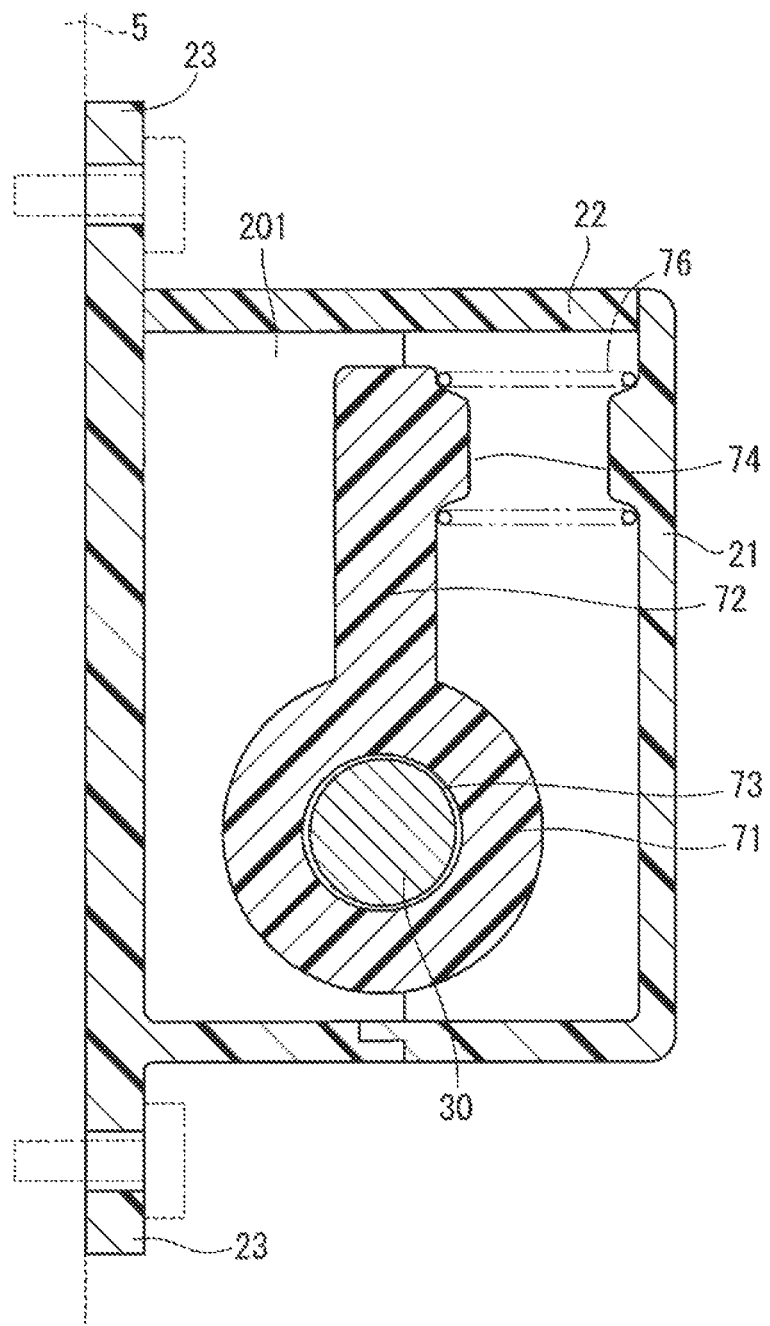
FIG. 8 is a cross-sectional view taken along a line VIII-VIII of FIG. 6.

As shown in FIG. 8, the first hysteresis mechanism part 70 is equipped with the rotor 71, an arm part 72 connected to the rotor 71, and a spring 76. A through hole 73 is defined in the center of the rotor 71, and the shaft 30 is inserted into the through hole 3. The rotor 71 is not fixed to the shaft 30.

An annular friction plate 712 is disposed on the right side face 711 of the rotor 71. The friction plate 712 slides with the inner wall of the base portion 23 and the housing 21 when the rotor 71 rotates. The gear teeth 714 are formed on the left side face 713 of the rotor 71, and have the inclined surface to contact the inclined surface of the first gear teeth 912 of the return rotor 91.

The arm part 72 is extended upward from the rotor 71. An upper end portion of the arm part 72 has a spring support part 74 which supports a first end of the spring 76. A second end of the spring 76 is supported by the inner wall of the housing 21, as shown in FIG. 8. The spring 76 biases the rotor 71 to be rotated counterclockwise.

The second hysteresis mechanism part 80 is equipped with the rotor 81, an arm part 82 connected to the rotor 81, and a spring (not shown). A through hole 83 is defined in the center of the rotor 81, and the shaft 30 is inserted into the through hole 83. The rotor 81 is not fixed to the shaft 30.

The helical gear teeth 812 are formed on the right side face 811 of the rotor 81, and have the inclined surface to contact with the inclined surface of the gear teeth 915 of the return rotor 91. An annular friction plate 814 is formed on the left side face 813 of the rotor 81. The friction plate 814 slides with the inner wall of the base portion 23 and the housing 21, when the rotor 81 rotates.

The arm part 82 is formed to extend from the rotor 81. An upper end portion of the arm part 82 has a spring support part 84 which supports a first end of the spring. A second end of the spring is supported by the inner wall of the housing 21. The spring biases the rotor 81 to be rotated counterclockwise, similarly to the rotor 71.

In the second embodiment, when a driver presses the pedal 10, the return rotor 91 and the shaft 30 which are connected with the pedal arm 15 rotate in the open direction in FIG. 7. That is, the return rotor 91 rotates clockwise. Because the spring 95 is compressed, the arm part 92 of the return mechanism part 90 biases the return rotor 91 to be rotated counterclockwise.

Moreover, the rotor 71 and the rotor 81 rotate clockwise in accordance with the clockwise rotation of the return rotor 91, because the rotor 71, 81 meshes with the gear teeth 912, 915 of the return rotor 91. At this time, the gear teeth 912 meshes with the gear teeth 714 of the rotor 71, and the gear teeth 915 meshes with the gear teeth 812 of the rotor 81, thereby the rotor 71 and the rotor 81 move in a direction separating from the return rotor 91. Therefore, the frictional force generated between the inner wall of the base portion 23 and the housing 21, and the friction plate 712, 814 becomes large.

Moreover, when the driver releases the pedal 10, the return rotor 91 and the shaft 30 rotate in the close direction in FIG. 7. When the return rotor 91 is rotated in the close direction, the rotor 71 and the rotor 81 move in a direction approaching the return rotor 91. Thereby the frictional force generated between the inner wall of the base portion 23 and the housing 21, and the friction plate 712, 814 becomes small.

In the second embodiment, the annular oil seal 24 is disposed between the through hole 285, 286 of the first wall 281 and the third wall 283, and the outer wall of the return rotor 91, so as to restrict a foreign matter from entering the interior space 201. Furthermore, the first end 303 and the second end 304 of the shaft 30 are rotatably supported by the first bearing 100 and the second bearing 200, respectively.

As shown in FIG. 6, the upward forces F1 and F2 are applied to the first end 303 and the second end 304 of the shaft 30 from the first bearing 100 and the second bearing 200, respectively, while the downward force F0 is applied to the shaft 30 through the pedal 10. Thereby, the same advantages can be obtained as the first embodiment.

Moreover, the pedal arm 15 is fixed to the connector 916 located at the center of the return rotor 91. Therefore, the downward force F0 applied to the shaft 30 is uniformly distributed between the first end 303 and the second end 304 of the shaft 30, and the shaft 30 is supported by the upward forces F1 and F2. Because the same force is applied to the first end 303 and the second end 304 respectively, the shaft 30 can be stably rotated.

Third Embodiment

Figure 10:
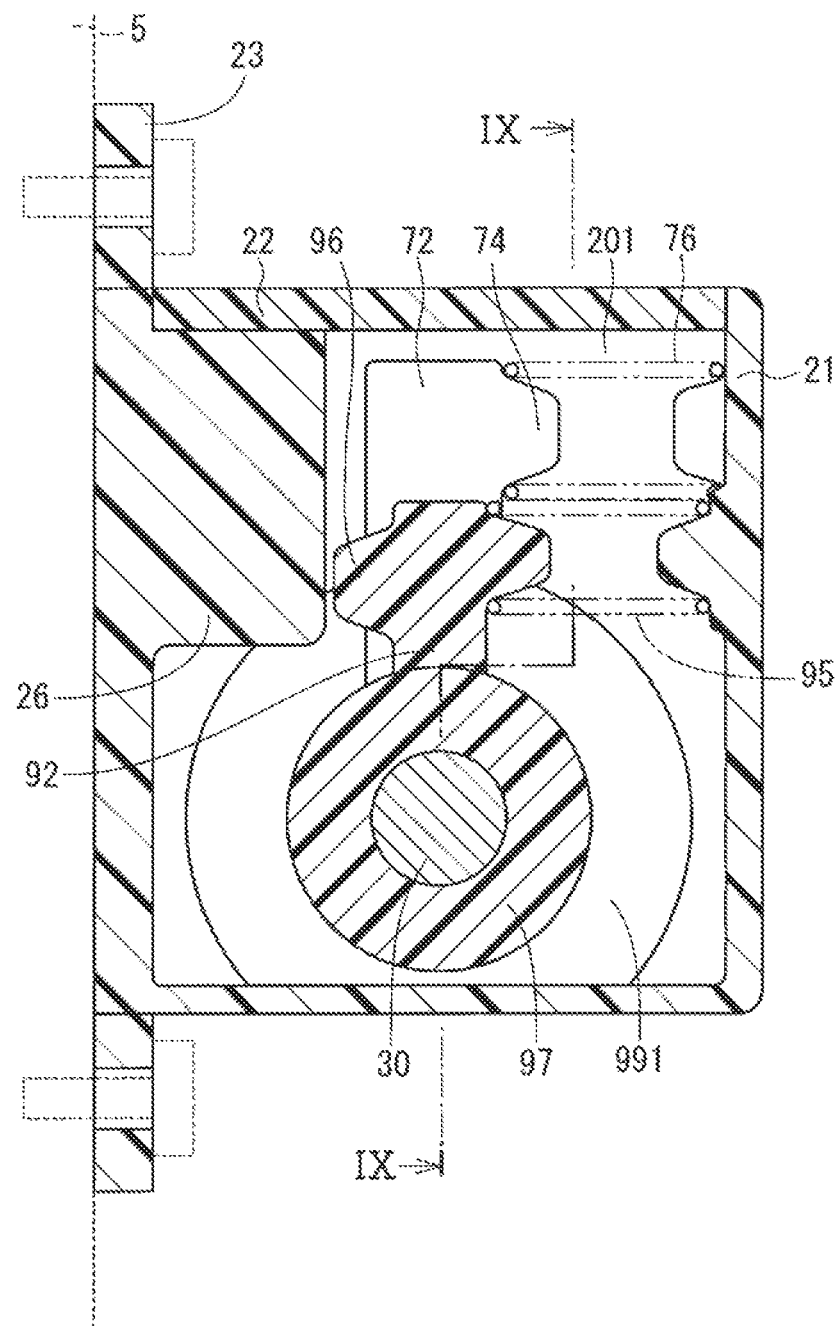
FIG. 10 is a cross-sectional view taken along a line X-X of FIG. 9.
Figure 11:
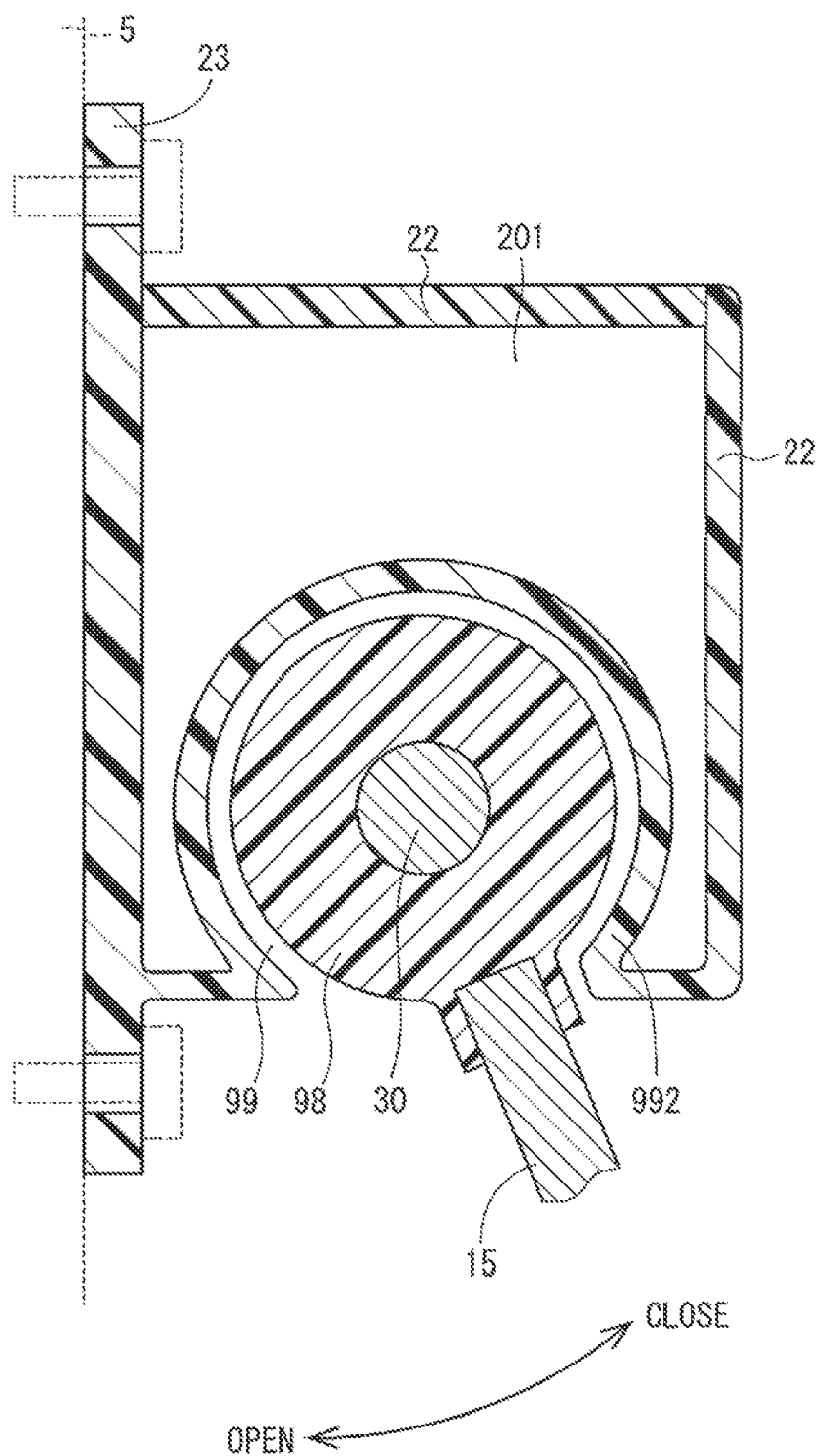
FIG. 11 is a cross-sectional view taken along a line XI-XI of FIG. 9.

An accelerator device 3 according to a third embodiment will be described with reference to FIGS. 9-11. The third embodiment is different from the second embodiment in the position relationship of the return mechanism part 90, the hysteresis mechanism parts 70, 80, and a pedal rotor 98. The substantially same parts and the components as the second embodiment are indicated with the same reference numeral and the same description will not be reiterated.

Figure 9:
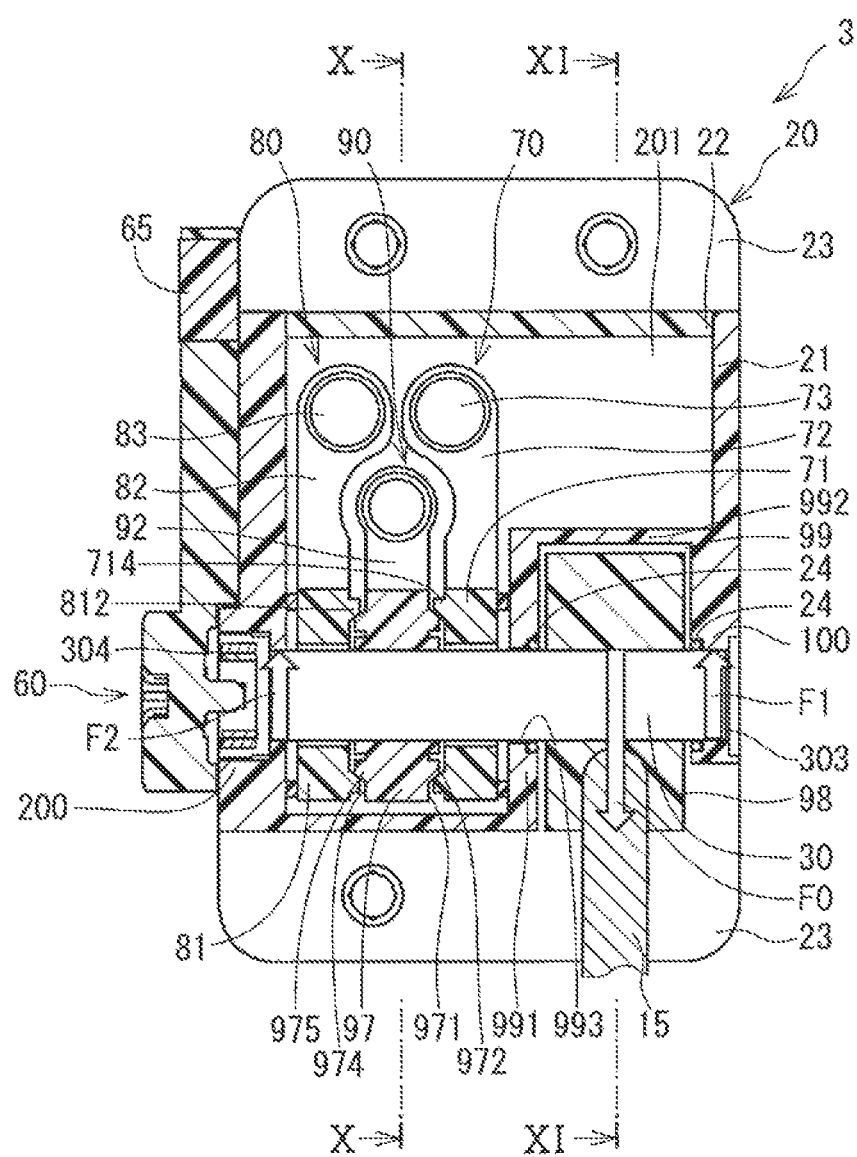
FIG. 9 is a cross-sectional view illustrating an accelerator device according to a third embodiment.

As shown in FIG. 9, the return mechanism part 90, the first hysteresis mechanism part 70, and the second hysteresis mechanism part 80 are disposed in the interior space 201, and are located offset on the left side with respect to the accommodation part 20. In contrast, the pedal arm 15 is connected to the pedal rotor 98 which is located offset on the right side with respect to the accommodation part 20. The second hysteresis mechanism part 80, the return mechanism part 90, the first hysteresis mechanism part 70, and the pedal rotor 98 are attached to the shaft 30 in this order from the side of the rotation angle detector 60. The pedal rotor 98 may correspond to a rotation shaft The housing 21 has a pedal rotor accommodator 99 which accommodates the pedal rotor 98. The pedal rotor accommodator 99 is constructed of a first wall 991 extending in the gravity direction and a second wall 992 extending in the horizontal direction, and has a cylindrical shape with a rotation axis extending in the horizontal direction.

The first wall 991 has a through hole 993 through which the shaft 30 is inserted. The oil seal 24 is arranged between the through hole 993 and the outer all of the shaft 30. The oil seal 24 intercepts the interior space 201 from the pedal rotor accommodator 99 communicating with outside. Moreover, the first bearing 100 and the second bearing 200 are defined in the housing 21 which respectively support the first end 303 and the second end 304 of the shaft 30 in the rotatable state.

First gear teeth 972 are formed on a right side face 971 of a return rotor 97 of the return mechanism part 90. The first gear teeth 972 have inclined surface to contact with inclined surface of gear teeth 714 of the rotor 71 of the first hysteresis mechanism part 70.

Second gear teeth 975 are formed on a left side face 974 of the return rotor 97. The second gear teeth 975 have inclined surface to contact with inclined surface of gear teeth 812 of the rotor 81 of the second hysteresis mechanism part 80.

According to the third embodiment, the annular oil seal 24 is disposed between the through hole 993 of the first wall 991 and the outer wall of the pedal rotor 98, so as to restrict a foreign matter from entering the interior space 201. Furthermore, the first end 303 and the second end 304 of the shaft 30 are rotatably supported by the first bearing 100 and the second bearing 200, respectively.

As shown in FIG. 9, the upward forces F1 and F2 are applied to the first and 303 and the second end 304 of the shaft 30 from the first bearing 100 and the second bearing 200, respectively, while the downward force F0 is applied to the shaft 30 through the pedal 10. Thereby, the same advantages can be obtained as the first embodiment.

Fourth Embodiment

An accelerator device 4 according to a fourth embodiment will be described with reference to FIGS. 12-15. The fourth embodiment is different from the second embodiment in the position of the pedal arm 15 which is fixed to the rotation shaft 30. The substantially same parts and the components as the second embodiment are indicated with the same reference numeral and the same description will not be reiterated.

Figure 12:
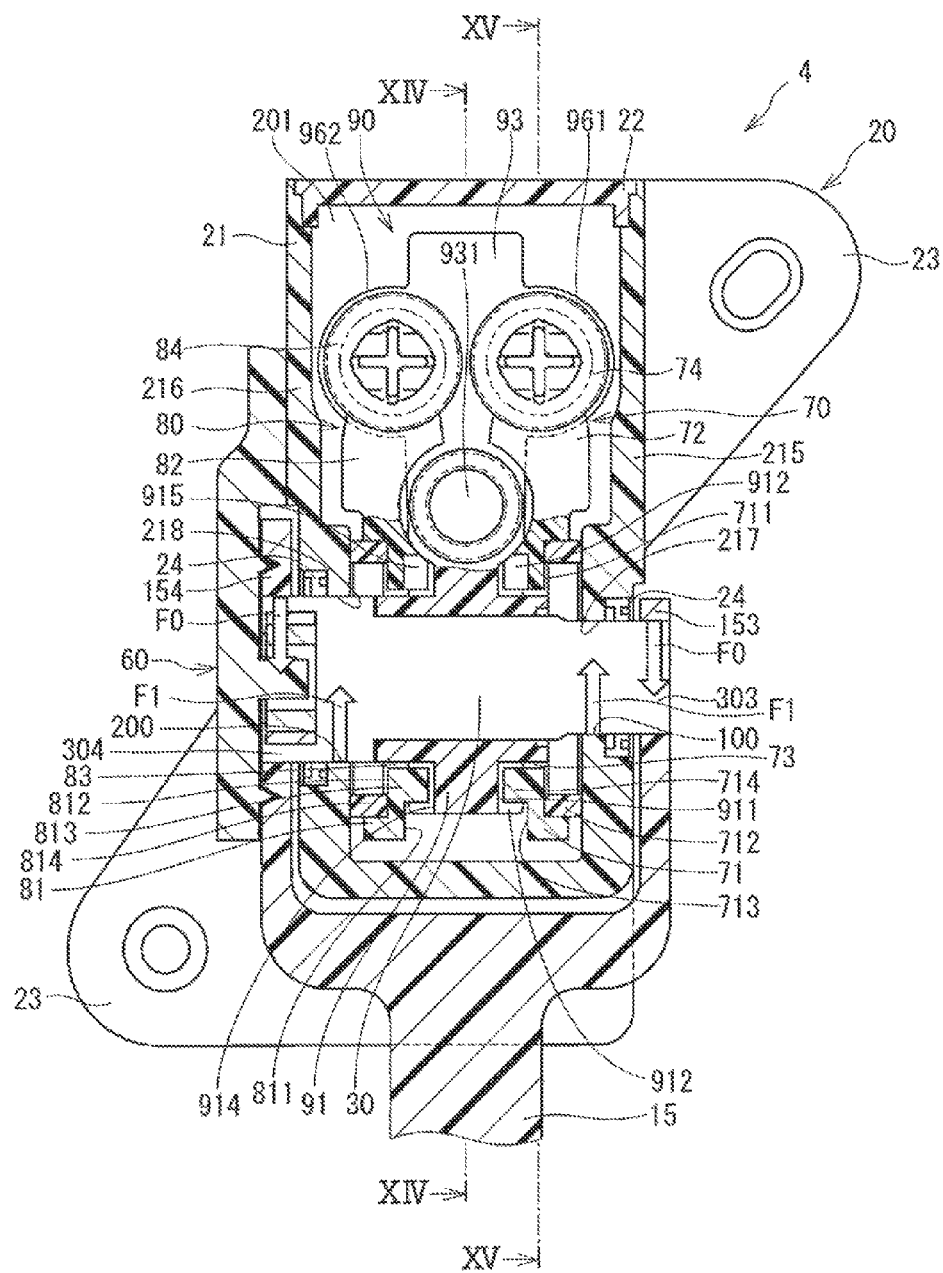
FIG. 12 is a cross-sectional view illustrating an accelerator device according to a fourth embodiment.
Figure 13:
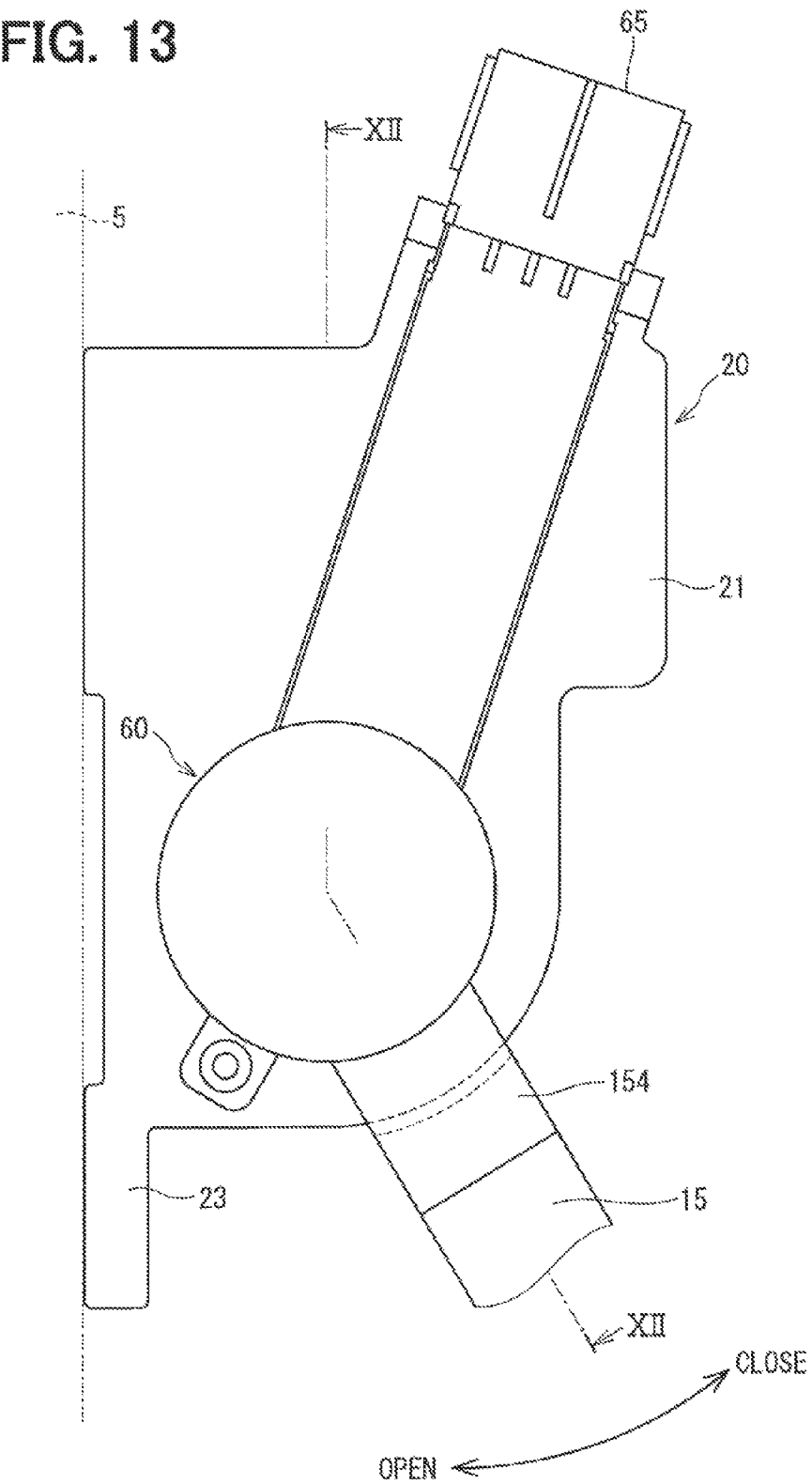
FIG. 13 is a side view illustrating the accelerator device of the fourth embodiment.

In the fourth embodiment, the first end portion 152 of the pedal arm 15 is branched into a first part 153 and a second part 154. As shown in FIG. 12, the first part 153, that is located on the right side, is fixed to the first end 303 of the shaft 30 projected from a side wall 215 of the housing 21. The second part 154, that is located on the left side, is fixed to the second end 304 of the shaft 30 projected from a side wall 216 of the housing 21. Thereby, the rotation angle of the pedal arm 15 corresponds to the rotation angle of the shaft 30 with one-to-one relationship.

Both ends 303, 304 of the shaft 30 are supported by the housing 21. Specifically, when the shaft 30 is inserted into a through hole 217, 218 defined in the side wall 215, 216 of the housing 21, the first end 303 of the shaft 30 is rotatably supported by the first bearing 100 of the side wall 215, and the second end 304 of the shaft 30 is rotatably supported by the second bearing 200 of the side wall 216.

Moreover, the annular oil seal 24 is disposed between the through hole 217, 218 and the outer wall of the shaft 30. The oil seal 24 intercepts the interior space 201 from outside of the accelerator device 4.

Figure 14:
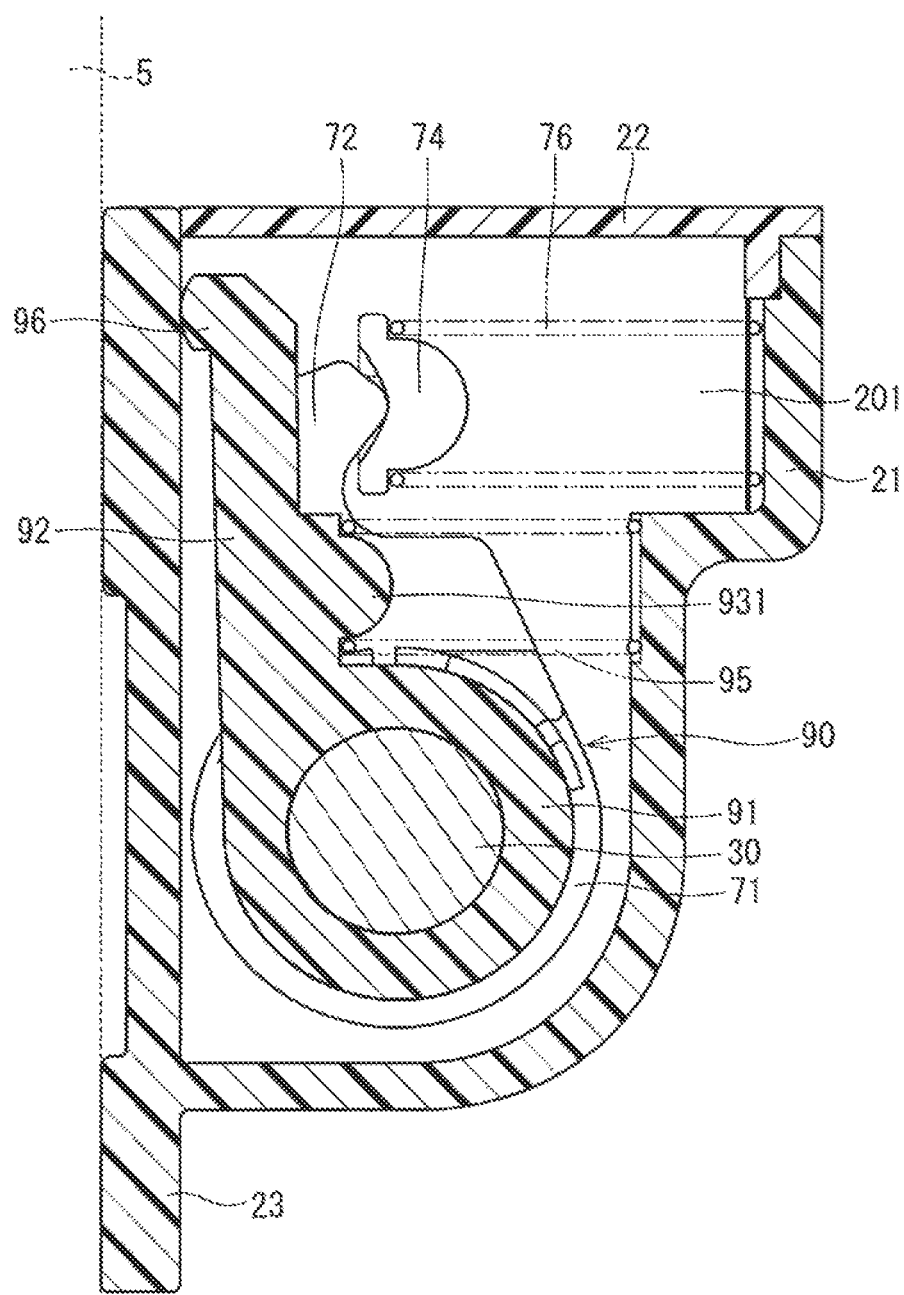
FIG. 14 is a cross-sectional view taken along a line XIV-XIV of FIG. 12.

As shown in FIG. 14, the return mechanism part 90 has the arm part 92 and the return spring 95. The return rotor 91 is press-fitted with the shaft 30, and the arm part 92 extends upward from the return rotor 91. The arm part 92 has a spring support part 931, a regulator 96, a spring support part 961, and a spring support part 962. The spring support part 931 is located adjacent to the return rotor 91, and the regulator 96 is located opposite from the return rotor 91 through the spring support part 931. The spring support part 961 extends on the right side of the regulator 96, and the spring support part 982 extends on the left side of the regulator 96.

The spring support part 931 has a convex shape projected to the opposite side away from the base portion 23. A first end of the return spring 95 is supported by the spring support part 931. A second end of the return spring 95 is supported by the inner wall of the housing 21, as shown in FIG. 14. When the pedal arm 15 rotates in the open direction in FIG. 13, the return spring 95 biases the return rotor 91 to be rotated in the counterclockwise direction in FIG. 14.

The regulator 96 has a convex shape projected toward the base portion 23. The regulator 96 is formed to contact the inner wall of the base portion 23 when the pedal 10 is not pressed and is located at the full-close position. Thereby, the regulator 96 regulates the rotation angle of the return rotor 91 in the counterclockwise direction.

Figure 15:
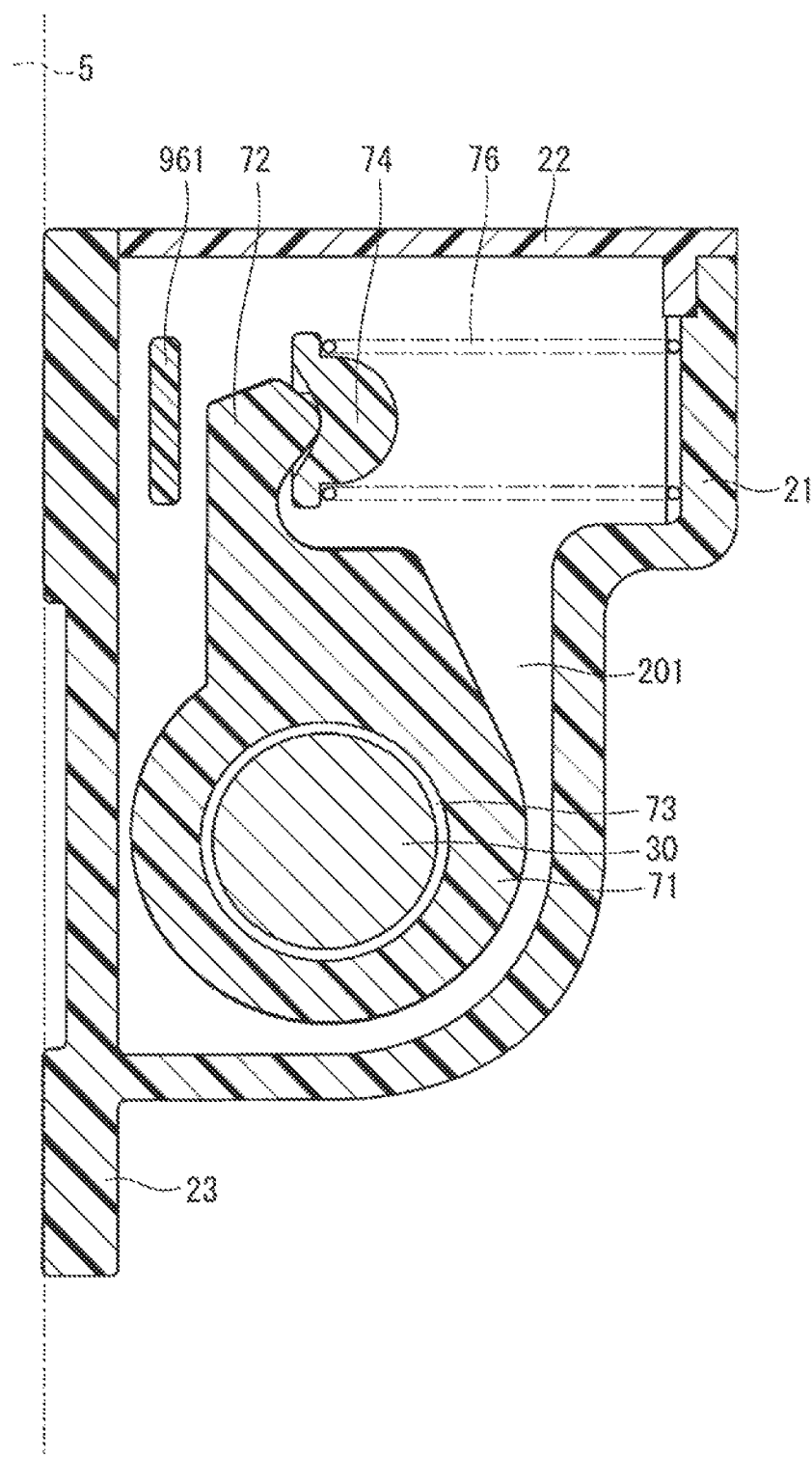
FIG. 15 a cross-sectional view taken along a line XV-XV of FIG. 12.

As shown in FIG. 15, the spring support part 961 is formed between the arm part 72 of the first hysteresis mechanism part 70 and the base portion 23. If the return spring 95 and the arm part 72 break, the biasing force of the spring 76 of the first hysteresis mechanism part 70 stops acting on the rotor 71. At this time, the biasing force of the spring 76 acts on the spring support part 961, thereby rotating the return rotor 91 in the close direction. The spring support part 962 is provided for the second hysteresis mechanism part 80, and has approximately the same configuration and operation as the spring support part 961.

According to the fourth embodiment, the same advantages can be obtained as the first embodiment. Further, as shown in FIG. 12, the self weight of the pedal arm 15 and an angular moment generated by the rotation of the pedal arm 15 act as the same force F0 to the first end 303 and the second end 304 of the shaft 30, respectively, from the first part 153 and the second part 154 of the first end portion 152 of the pedal arm 15. The same force F0 is uniformly distributed by the first bearing 100 and the second bearing 200 which rotatably support the shaft 30, and the shaft 30 is rotatably supported by the upward force F1 applied from each of the first bearing 100 and the second bearing 200. Therefore, because the same force is symmetrically applied to the shaft 30, the shaft 30 can be more stably rotated.

Other Embodiments

The pedal arm is not limited to be located offset rightward. The pedal arm may be located offset leftward, for example, in the first embodiment. Similarly in the third embodiment, the pedal rotor may be located offset leftward relative to the accelerator device.

The arrangement order on the rotation shaft is not limited to the above description. The second end of the rotation shaft that is supported by the second bearing may be arranged between the return rotor and the oil seal. In this case, another rotation shaft is provided, and the return rotor is fixed to the another rotation shaft.

The bearing of the rotation shaft is not limited to be defined in the housing or the covering. Alternatively, another shaft may be arranged in the housing or the covering to protrude toward the interior space, and the first end or the second end of the rotation shaft may be formed to surround the another shaft. That is, the bearing may be formed on the side of the rotation shaft.

A mechanical seal or gasket may be used instead of the oil seal to intercept the interior space from outside, and may be arranged in a clearance of the accommodating part accommodating the return mechanism part and the rotation angle detector so as to intercept the communication between the interior space and the outside.

The return spring and the spring of the hysteresis mechanism part are supported by the front-side inner wall in the first embodiment. The return spring, the spring of the first hysteresis mechanism part and the spring of the second hysteresis mechanism part are supported by the front-side inner wall, in the second and third embodiments. Alternatively, the spring may be supported by a back-side inner wall, that is, may be supported by an inner wall adjacent to the base portion. In this case, the return spring and the spring of the hysteresis mechanism part are arranged to generate the biasing force in a direction compressing the spring.

Such changes and modifications are to be understood as being within the scope of the present disclosure as defined by the appended claims.

What is claimed is:

1. An accelerator device comprising:
an accommodation part to be attached to a vehicle;
a rotation shaft having a first end and a second end that are supported by the accommodation part;
a pedal part including
a pedal arm having a first end fixed to the rotation shaft and
a pedal arranged to a second end of the pedal arm to be pressed by a driver of the vehicle in an open direction;
a rotation angle detector accommodated in an interior space of the accommodation part and detecting a rotation angle of the rotation shaft with respect to the accommodation part;
a return mechanism part accommodated in the interior space of the accommodation part and biasing the rotation shaft to be rotated in a close direction opposite from the open direction;
a seal member arranged in a clearance through which the interior space of the accommodation part communicates with an arm accommodation space accommodating the pedal arm, the seal member restricting a foreign matter from entering the interior space of the accommodation part; and
wherein the arm accommodation space and the accommodation part are partitioned from each other by a first wall and a second wall perpendicular with each other,
the first wall spreads in a direction perpendicular to the rotation shaft,
the first wall has a through hole corresponding to the clearance,
the rotation shaft passes through the through hole, and
the seal member is arranged between a wall surface of the through hole and an outer wall of the rotation shaft.

2. The accelerator device according to claim 1, wherein the clearance is defined between the accommodation part and an outer wall of the rotation shaft.

* * * * *